United States Patent [19]

Dagustany et al.

[11] Patent Number: 4,995,917

[45] Date of Patent: Feb. 26, 1991

[54] MANUFACTURING PROCESS FOR DIE-CAST LIGHT-METAL WHEELS OF PASSENGER CARS

[75] Inventors: Amer Dagustany, Munich; Jochen Spriestersbach, Wendelstein; Bernd Günther, Garching; Gerhard Knall, Munich, all of Fed. Rep. of Germany

[73] Assignee: Bayerische Motoren Werke Aktiengesellschaft, Fed. Rep. of Germany

[21] Appl. No.: 335,781

[22] PCT Filed: Jul. 26, 1988

[86] PCT No.: PCT/EP88/00675

§ 371 Date: Mar. 27, 1989

§ 102(e) Date: Mar. 27, 1989

[30] Foreign Application Priority Data

Jul. 28, 1987 [DE] Fed. Rep. of Germany ....... 3724928

[51] Int. Cl.$^5$ .............................................. C22F 1/43
[52] U.S. Cl. ......................................... 148/3; 148/159
[58] Field of Search ............. 148/3, 2, 11.5 A, 12.7 A, 148/159

[56] References Cited

U.S. PATENT DOCUMENTS 3,856,360 12/1974 Lindberg ................................ 301/65
4,341,425 7/1982 Streicher et al. ...................... 301/65
4,576,791 3/1986 Thistlethwaite ..................... 420/552

FOREIGN PATENT DOCUMENTS 0021227 5/1981 European Pat. Off. .
1169682 3/1964 Fed. Rep. of Germany .
1300416 6/1962 France .
2319445 2/1977 France .

OTHER PUBLICATIONS

German Din Standard 1725 (Feb., 1986) part 2 DK 669.715.018-4:621.74:620.1, pp. 3,1–14.
DK 669.715.018.28-4:621.74 part 2, 1st Additim, pp. 1–6
DK 669,715.018.2:621.74, part 5, pp. 1–6.
DK 669.715.018.2:621.74, part 5, 1st Additim, pp. 1–2.
Aluminum–Taschenbuck (1984) Chapter 13, pp. 867–884, 435 Technische Hinneise, p. 14.
Alusinesse Deutschland, Hüttenaluminium Gusslegler Ungey, p. 24.
Aluminum Pechiney, Apr. 1981, pp. 1, 13 and 14.

*Primary Examiner*—R. Dean
*Attorney, Agent, or Firm*—Evenson, Wands, Edwards, Lenahan & McKeown

[57] ABSTRACT

A manufacturing process for die-cast light-metal parts, particularly die-cast light-metal wheels for passenger cars using gravity die-casting process using an almost eutectic refined GK-ALSill/Sr-kf alloy having 0.05 to 0.1% parts by weight of magnesium and without any additional significant hardenable constituents. The die-cast wheel is subject to quenching from a temperature of 350° C. to 475° C. immediately after its removal from the die in water of no more than 50° C., and as a result, a considerable increase of the bending fatigue strength in central areas, and of the impact resistance in the edge areas of the wheel is achieved.

16 Claims, No Drawings

MANUFACTURING PROCESS FOR DIE-CAST LIGHT-METAL WHEELS OF PASSENGER CARS

BACKGROUND AND SUMMARY OF THE INVENTION

The invention relates to a manufacturing process for die-cast light-metal parts, particularly for die-cast light-metal wheels of passenger cars, using an almost eutectic refined AlSi alloy, which, in addition to Al, contains parts by weight of approximately 9.5% to 12.5% silicon and other low alloying constituents, such as magnesium, iron, manganese, titanium, copper, zinc, as well as no more than 0.05 each and a total of no more than 0.15 other impurities. The parts, after die-casting and solidification, are removed from the casting die and cooled. The alloy, which is used in the manufacturing of parts of this type and particularly of passenger car wheels, contains proportions of hardenable alloying constituents, which are kept as low as possible, because these hardenable alloying constituents reduce the crashworthiness or ductility of the parts. However, in order to be able to further reduce wall thickness and the weight of the parts, the requirement exists to simultaneously improve their strength as well as their ductility, or to at least achieve an improvement in one of these two characteristics.

The invention achieves a surprisingly high increase of the strength without any reduction, or even with a simultaneous slight increase in ductility, in a surprisingly simple manner by having the alloy contain at least 0.05 to no more than 0.15% parts by weight of magnesium. The parts' interior areas and areas with concentrations of mass, such as the hub area and the disk of wheels, are quenched in water immediately after their removal from the die and before a temperature measured at their surfaces is below at least 380°. This type of a narrow and low defining of the magnesium content and other hardenable constituents, together with a quench hardening of such an alloy, has up to now not been considered useful and has therefore not been used.

Although a less targeted cooling of similarly alloyed wheels in water, immediately after the removal from the die is known for the purpose of a subsequent easier handling, there is no known targeted improvement of the strength for these parts that would correspond to the results of the invention.

Particularly in the case of die-cast light-metal wheels for passenger cars, an increase of up to approximately four times the rotary bending fatigue limit, which is important, can be achieved by the process according to the invention in the hub area and the wheel disk area. A simultaneous up to 25% increase of the impact ductility at the rim flange can be obtained if the thin-walled impact-resistant rim flange area has its quenching take place after the temperature reaches 400° C.

In connection with an alloy of the GK-AlSi11 type, according to DIN (German Standard) 1725, Part 2 and 5/2.86 which contains parts by weight in percent of no more than 10.5 Si, 0.1 Mg, 0.2 Fe, 0.05 Mn, 0.1 Ti and 0.05 Zn and a strontium refinement with approximately 0.025% Sr, and a grain refining treatment with approximately 0.1% of an aluminum titanium intermediate alloy, $AlTi_5B_1$, is provided with narrow tolerances. The temperature at the time of the quenching which differ at the hub and rim flange areas as a result of the different cooling speed, should be approximately 400° C. to 500° C. in the hub area and approximately 325° C. to 375° C. in the rim flange area. This results in an increase of the strength and of the ductility which is advantageous in view of the respective purpose of the casting for wheels for vehicles. An appropriate application of these relationships to other casting parts having thin walls is within the scope of this invention.

When the die-casting takes place merely at a molten mass of no more than 720° in the melting furnace and of no more than 680° C. in the holding furnace, the strength and the ductility will increase, to approximately the same extent, i.e., by approximately 50%. If the quenching of interior areas and areas with concentrations of mass takes place before surface temperatures thereat reach 380° C. and the temperature is approximately 400° C. to 500° C. in the hub area and 325° C. to 375° C. in the rim area and with a molten mass of no more than 720° C. in the melting furnace and of no more than 680° C. in the holding furnace, an additional increase of at least the ductility from approximately 25% to approximately 50% is obtained.

If the parts or wheels are subject to artificial aging or tension removal at a temperature of approximately 190° C. for a duration of approximately 20 minutes, perhaps during a surface coating or painting operation, one avoids, after the quench hardening, a remaining tension, which causes the formation of cracks. Practical tests have led to the also surprising result that a sufficient artificial aging is achieved merely by the heat treatment, which is customary in the case of unquenched parts or wheels during the drying phase of a painting process, so that no additional heating energy is required for a separate heat treatment.

In an embodiment of the process according to the invention, series-produced die-cast light-metal wheels for passenger cars measuring 6 J×14 consisting of the aluminum silicon die-cast alloy GK-AlSi11/Sr-kf, used in the series production, according to DIN (German Standard) 1725, Part 2 and 5/02.86, were produced in the gravity die-casting process, which, except for the quench hardening, was unchanged from that of the series production. Specifically, the following alloying constituents in percent in weight, which were determined by spectral analysis: Si 9.64 - Mg 0.08 - Fe 0.18 - Mn 0.01 - Ti 0.09 - Cu 0.00 - Zn 0.01 - Sr 0.025, as well as traces of less than 0.01 of Ni, Pb, P, Ca, Na, Cr and B were found. The temperature of the molten mass during the die-casting was 740° C. in the melting furnace and 710° C. in the holding furnace; the quenching temperature, at the time of the removal from the die and immersion into 25° C. water, was 450° C. in the hub area and 375° C. in the rim flange area, with a quenching time of approximately 3 to 10 seconds. Then the cooling to the ambient temperature took place in air. After a moderately long interval, the wheels were machined in the hub area and the rim flange area, and after a further moderately long interval, were subjected to a surface treatment with painting, including a drying period of approximately 20 minutes at a constant drying temperature of 190° C. with a subsequent cooling in air.

A measuring of the fatigue strength on nine wheels at a rotating bending fatigue test bench resulted in an average endurance value of almost 6 million in contrast to an average endurance value of approximately one million in the case of series-produced wheels without any quenching, but with otherwise corresponding values of the manufacturing process. The impact resistance or ductility was determined, in each case, at four points of the wheel, with an average deformation energy value of from 500 to 600 joules in contrast to from 400 to 500 joules in the aforementioned non-quenching process.

In a further embodiment of the process according to the invention, while the method and the composition of the alloy were the same within extremely narrow limits as in the first embodiments, only the temperature of the molten mass was lowered to no more than 720° C. in the melting furnace and to no more than 680° C. in the holding furnace, and, as in the case of the series-production, no quench hardening was carried out. When average values were obtained again from nine wheels using the same techniques as in the first embodiment for measuring the fatigue strength and the deformation, increases were determined from approximately 1 to 2 million with respect to endurance and from approximately between 440 and 500 joules to approximately between 600 and 700 joules at the four points of each wheel respectively.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A manufacturing process for diecasting of light-metal wheels of passenger cars, using a known, almost eutectic refined AlSi alloy, which has approximately 9.5% to 12.5% parts by weight of silicon and at least 0.05 to 0.15% parts by weight of magnesium, as well as no more than from 0.00 to 0.05% parts by weight of each other impurity and a total of no more 0.15% parts by weight of such other impurities, comprising the steps of
   die-casting the alloy;
   allowing the alloy to solidify;
   after solidification, removing the wheels casting from the casting die;
   immediately quenching the wheel casting in water before the wheel casting reaches a temperature measured at its surface, of at least 380° C. at interior areas and areas with concentrations of mass; and
   allowing the wheel casting to cool.

2. A process according to claim 1, wherein thin-walled impact-resistant rim flange areas of the wheel casting are quenched when a temperature is below 400° C. at the thin-walled areas.

3. A process according to claim 1, wherein the alloy is of the GK-AlSi11 type, according to DIN (German Standard) 1725, Part 2 and 5/2.86 and contains parts by weight in percent of no more than 10.5 Si, 0.1 Mg, 0.2 Fe, 0.05 Mn, 0.1 Ti and 0.05 Zn, and wherein there is a strontium refinement with approximately 0.025% Sr, and a grain refining treatment with approximately 0.1% of an aluminum titanium intermediate alloy, $AlTi_5B_1$ being used; wherein the wheels are quenched, when the temperature is approximately 400° C. to 500° C. in the hub area of the wheel, and when the temperature is approximately 325° C. to 375° C. in the rim flange area of the wheel.

4. A process according to claim 2, wherein the alloy is of the GK-AlSi11 type, according to DIN (German Standard) 1725, Part 2 and 5/2.86 and contains parts by weight in percent of no more than 10.5 Si, 0.1 Mg, 0.2 Fe, 0.05 Mn, 0.1 Ti and 0.05 Zn, and wherein there is a strontium refinement with approximately 0.025% Sr, and a grain refining treatment with approximately 0.1% of an aluminum titanium intermediate alloy, $AlTi_5B_1$ being used; wherein the wheels are quenched, when the temperature is approximately 400° C. to 500° C. in the hub area of the wheel, and when the temperature is approximately 325° C. to 375° C. in the rim flange area of the wheel.

5. A process according to claim 1, wherein the wheels are die-cast at a temperature of the molten mass of no more than 720° C. in the melting furnace and of no more than 680° C. in a holding furnace.

6. A process according to claim 2, wherein the wheels are die-cast at a temperature of the molten mass of no more than 720° C. in the melting furnace and of no more than 680° C. in a holding furnace.

7. A process according to claim 3, wherein the wheels are die-cast at a temperature of the molten mass of no more than 720° C. in the melting furnace and of no more than 680° C. in a holding furnace.

8. A process according to claim 4, wherein the wheels are die-cast at a temperature of the molten mass of no more than 720° C. in the melting furnace and of no more than 680° C. in a holding furnace.

9. A process according to claim 1, wherein the wheels are subjected to an artificial aging or tension removal during the further course of the manufacturing process.

10. A process according to claim 2, wherein the wheels are subjected to an artificial aging or tension removal during the further course of the manufacturing process.

11. A process according to claim 3, wherein the wheels are subjected to an artificial aging or tension removal during the further course of the manufacturing process.

12. A process according to claim 4, wherein the wheels are subjected to an artificial aging or tension removal during the further course of the manufacturing process.

13. A process according to claim 9, wherein the wheels are subjected to a drying process at approximately 190° C. and for a duration of approximately 20 minutes during a painting step as an artificial aging or tension-removal process.

14. A process according to claim 10, wherein the wheels are subjected to a drying process at approximately 190° C. and for a duration of approximately 20 minutes during a painting step as an artificial aging or tension-removal process.

15. A process according to claim 11, wherein the wheels are subjected to a drying process at approximately 190° C. and for a duration of approximately 20 minutes during a painting step as an artificial aging or tension-removal process.

16. A process according to claim 12, wherein the wheels are subjected to a drying process at approximately 190° C. and for a duration of approximately 20 minutes during a painting step as an artificial aging or tension-removal process.

* * * * *